US008585547B2

(12) United States Patent
Spix et al.

(10) Patent No.: US 8,585,547 B2
(45) Date of Patent: Nov. 19, 2013

(54) SYSTEM AND METHOD FOR PREVENTING ICING IN POSITIVE CRANKCASE VENTILATION SYSTEMS

(75) Inventors: Thomas A. Spix, Rochester Hills, MI (US); Grant K. Tappen, Washington, MI (US)

(73) Assignee: GM Global Technology Operations LLC

( * ) Notice: Subject to any disclaimer, the term of this patent is extended or adjusted under 35 U.S.C. 154(b) by 435 days.

(21) Appl. No.: 13/052,438

(22) Filed: Mar. 21, 2011

(65) Prior Publication Data

US 2012/0244994 A1 Sep. 27, 2012

(51) Int. Cl.
*F16H 59/00* (2006.01)

(52) U.S. Cl.
USPC .......... 477/98

(58) Field of Classification Search
USPC .......... 477/98
See application file for complete search history.

(56) References Cited

U.S. PATENT DOCUMENTS

| | | | | |
|---|---|---|---|---|
| 5,024,125 | A * | 6/1991 | Baba | 477/98 |
| 2009/0036263 | A1 * | 2/2009 | Iwase et al. | 477/3 |
| 2009/0044791 | A1 * | 2/2009 | Rice et al. | 123/574 |

* cited by examiner

*Primary Examiner* — Edwin A Young

(57) ABSTRACT

A control system for an engine includes an icing condition detection module and an icing prevention module. The icing condition detection module detects an icing condition of a positive crankcase ventilation (PCV) system of the engine when an ambient temperature is less than a predetermined temperature for a first predetermined period. The icing prevention module increases engine speed for a second predetermined period when the icing condition is detected.

20 Claims, 4 Drawing Sheets

SYSTEM AND METHOD FOR PREVENTING ICING IN POSITIVE CRANKCASE VENTILATION SYSTEMS

FIELD

The present disclosure relates to internal combustion engines and more particularly to a system and method for preventing icing in positive crankcase ventilation (PCV) systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines draw air into an intake manifold through an induction system that may be regulated by a throttle. The air in the intake manifold is distributed to a plurality of cylinders and combined with fuel to create an air/fuel (NF) mixture. The NF mixture is combusted within the cylinders to drive pistons which rotatably turn a crankshaft and generate drive torque. The drive torque is then transferred to a driveline of a vehicle via a transmission. Exhaust gas produced during combustion may be expelled from the cylinders into an exhaust manifold and then treated by an exhaust treatment system before being released into the atmosphere.

Gases within a cylinder (i.e., the NF mixture and/or the exhaust gas) may enter a crankcase of the cylinder. For example, excessive wear to the cylinder wall and/or the piston ring may allow the gases to enter the crankcase. Gases that enter the crankcase may also be referred to as "blow-by vapors." The crankcase includes the crankshaft which is connected to the piston. The crankcase also includes oil for lubricating the movement of the crankshaft and the piston. Blow-by vapors may contaminate the oil which may result in damage to the cylinder and/or its components.

SUMMARY

A control system for an engine includes an icing condition detection module and an icing prevention module. The icing condition detection module detects an icing condition of a positive crankcase ventilation (PCV) system of the engine when an ambient temperature is less than a predetermined temperature for a first predetermined period. The icing prevention module increases engine speed for a second predetermined period when the icing condition is detected.

A method for controlling an engine includes detecting an icing condition of a positive crankcase ventilation (PCV) system of the engine when an ambient temperature is less than a predetermined temperature for a first predetermined period, and increasing engine speed for a second predetermined period when the icing condition is detected.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
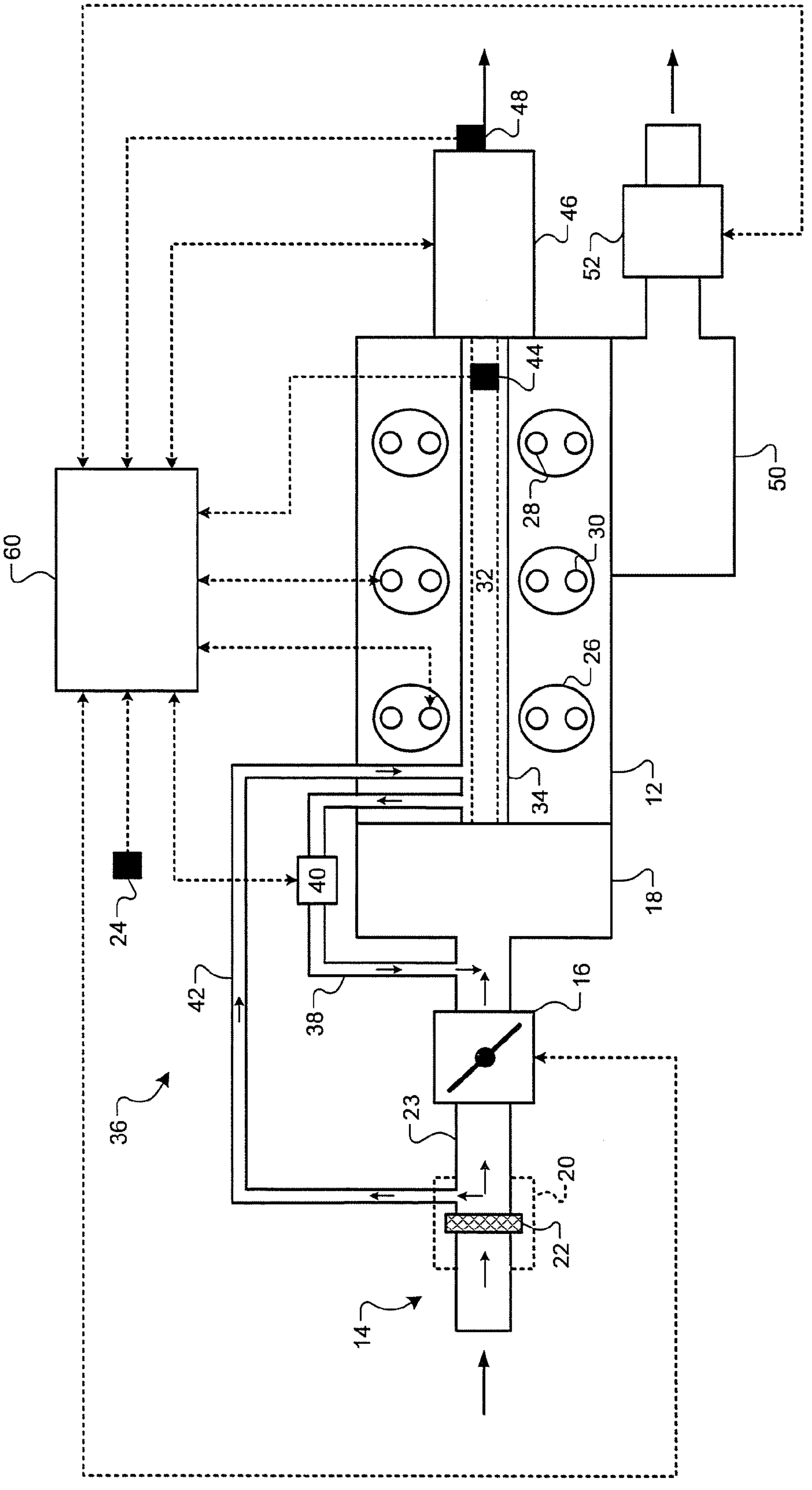
FIG. 1 is a functional block diagram of an engine system according to one implementation of the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Positive crankcase ventilation (PCV) systems may be implemented to prevent damage caused by blow-by vapors. PCV systems may use a vacuum of the intake manifold to draw blow-by vapors out of the crankcase and into the intake manifold. Specifically, the blow-by vapors may be drawn into an air filter housing downstream from an air filter to prevent particulates from accumulating in the intake manifold. After passing through the throttle, the blow-by vapors are combined with the A/F mixture and combusted during future combustion cycles.

PCV systems include a PCV hose and a PCV flow regulator. The PCV hose connects the crankcase to the air inlet duct. The PCV flow regulator regulates the flow of blow-by vapors through the PCV hose and into the intake system. Specifically, the PCV flow regulator may include a spring-loaded valve that opens as a pressure of blow-by vapors in the crankcase increases. The PCV valve or flow regulator, however, may remain closed when the pressure of blow-by vapors in the crankcase is low to prevent dilution of the A/F mixture within the cylinder. PCV systems may also include a breather tube that introduces additional fresh air into the crankcase for improved air circulation.

Icing may occur in the PCV system during low temperature operation of the engine. The low ambient temperature may cause ice to accumulate in the PCV system. For example, ice may accumulate in the PCV hose and/or the breather tube. Therefore, when the PCV system is open, ice and/or water may be drawn into the intake manifold and into the cylinders which may cause engine stalls, engine misfires, and/or damage to the engine. Specifically, icing may occur when an ambient temperature is less than a predetermined temperature. More specifically, icing may occur when the ambient temperature is less than or equal to freezing (i.e., 0 degrees Celsius, or ° C.). However, for example only, icing may occur more often at a predetermined temperature of approximately −30° C.

Accordingly, a system and method are presented for preventing icing in a PCV system of an engine. The system and method may first detect an icing condition of the PCV system when an ambient temperature is less than a predetermined temperature for a first predetermined period. As previously described, the predetermined temperature may be less than or equal to 0° C. For example only, the predetermined temperature may also be approximately −30° C.

In some implementations, the system and method may detect the icing condition when for the first predetermined period (i) the ambient temperature is less than the predetermined temperature, (ii) engine speed is greater than a predetermined engine speed, and (iii) vehicle speed is greater than a predetermined vehicle speed. For example, the predetermined engine speed may be greater than or equal to an idle speed of the engine. The predetermined vehicle speed may represent a typical freeway/highway speed. Therefore, for example, the predetermined vehicle speed may be greater than or equal to 40 miles per hour (mph). However, for example only, the predetermined vehicle speed may be approximately 50 mph.

When the icing condition is detected, the system and method may increase the engine speed for a second predetermined period. For example, the second predetermined period may be based on a design of the engine. The increased engine speed may increase oil temperature and a temperature of blow-by vapors in the PCV system, thereby preventing PCV icing. Specifically, the system and method may increase the engine speed by downshifting a transmission of the engine for the second predetermined period. More specifically, the system and method may downshift the transmission by N gear ratios (N≥1). For example only, the system and method may downshift the transmission from a highest gear ratio to a next-highest gear ratio (e.g., $6^{th}$ to $5^{th}$, $5^{th}$ to $4^{th}$, $4^{th}$ to $3^{rd}$, etc.). After the second predetermined period has expired, the system and method may then decrease engine speed to a desired level and continue normal engine operation.

Referring now to FIG. 1, an engine system 10 includes an engine 12. The engine 12 may be a spark ignition (SI) engine, a compression ignition (CI) engine (e.g., a diesel engine), or a homogeneous charge compression ignition (HCCI) engine. The engine system 10 may also include a different type of engine and/or may include additional components such as an electric motor and a battery system.

The engine 12 draws air into an intake manifold 18 through an induction system 14 that may be regulated by a throttle 16. For example, the throttle 16 may be electrically controlled using electronic throttle control (ETC). The induction system 14 may include an air filter housing 20 and an air filter 22. The air filter 22 may filter air drawn into the intake manifold 18 to remove particulates. An ambient temperature sensor 24 measures a temperature of air outside of the engine 12. For example, the ambient temperature sensor 24 may measure the ambient air temperature in ° C. In some implementations, the ambient temperature sensor 24 may be attached to or located within the engine 12. The ambient temperature sensor 24, however, may also be located elsewhere such as in a control module 60.

Air in the intake manifold 18 is distributed to a plurality of cylinders 26. While six cylinders are shown, the engine 12 may include other numbers of cylinders. Fuel injectors 28 inject fuel into intake ports of the cylinders 26 (port fuel injection) or directly into the cylinders 26 (direct fuel injection). Spark plugs 30 may ignite the A/F mixture within the cylinders 26 to drive pistons which rotatably turn a crankshaft 32 and generate drive torque. In Cl and HCCI engines, however, spark plugs 30 may not be used for combustion or may be used merely for spark-assist, respectively. The crankshaft 32 may be connected to pistons (not shown) of the cylinders 26, respectively, and housed within a crankcase 34 that includes oil for lubrication of moving parts.

A PCV system 36 may draw blow-by vapors from the crankcase 34 and into the air inlet duct 23 at a location downstream from the air filter 22. The PCV system 36 may include a PCV hose 38 that connects the crankcase 34 to the intake manifold 18. The PCV system 36 may also include a PCV valve or other flow regulator 40 that regulates the flow of blow-by vapors from the crankcase 34 to the intake manifold 18. For example, the PCV valve 40 may include a spring-loaded valve (or an orifice or another airflow regulating device) that opens based on pressure differential between the crankcase 34 and the intake manifold 18. The PCV valve 40 may also be another suitable type of valve or other flow regulator such as an electronic valve controlled by the control module 60. In some implementations the PCV system 36 may further include a breather tube 42 that connects the crankcase to the air filter housing 20 or to the air inlet duct 23 of the induction system 14 at a location downstream from the air filter 22. The breather tube 42 allows fresh air to circulate in the crankcase 34 further diluting the blow-by gases and preventing oil contamination (i.e., improved circulation).

An engine speed sensor 44 measures a rotational speed of the crankshaft 32 (i.e., engine speed). For example, the engine speed sensor 44 may measure the engine speed in revolutions per minute (RPM). A transmission 46 transfers the drive torque from the crankshaft 32 to a driveline (e.g., wheels) of a vehicle. In some implementations, the transmission 46 may be coupled to the crankshaft 32 via a fluid coupling such as a torque converter. A transmission output shaft speed (TOSS) sensor 48 measures a rotational speed of an output shaft of the transmission 46. For example, the TOSS sensor 48 may measure the TOSS in RPM. Measurements from the TOSS sensor 48 may indicate vehicle speed.

Exhaust gas resulting from combustion may be expelled from the cylinders 26 into an exhaust manifold 50. An exhaust treatment system (ETS) 52 may treat the exhaust gas in the exhaust manifold to remove particulates and/or decrease emissions before releasing the exhaust gas into the atmosphere. For example, the ETS 52 may include at least one of oxidation catalysts, nitrogen oxide absorbers/adsorbers, selective catalytic reduction systems, particulate matter filters, and three-way catalytic converters.

The control module 60 controls operation of the engine system 10. The control module 60 may receive signals from the throttle 16, the ambient temperature sensor 24, the fuel injectors 28, the spark plugs 30, the PCV valve 40, the engine speed sensor 44, the transmission 46, the TOSS sensor 48, and/or the ETS 52. The control module 60 may control the throttle 16, the fuel injectors 28, the spark plugs 30, the PCV valve 40, the transmission 46, and/or the ETS 52. The control module 60 may also implement the system or method of the present disclosure.

Figure 2:
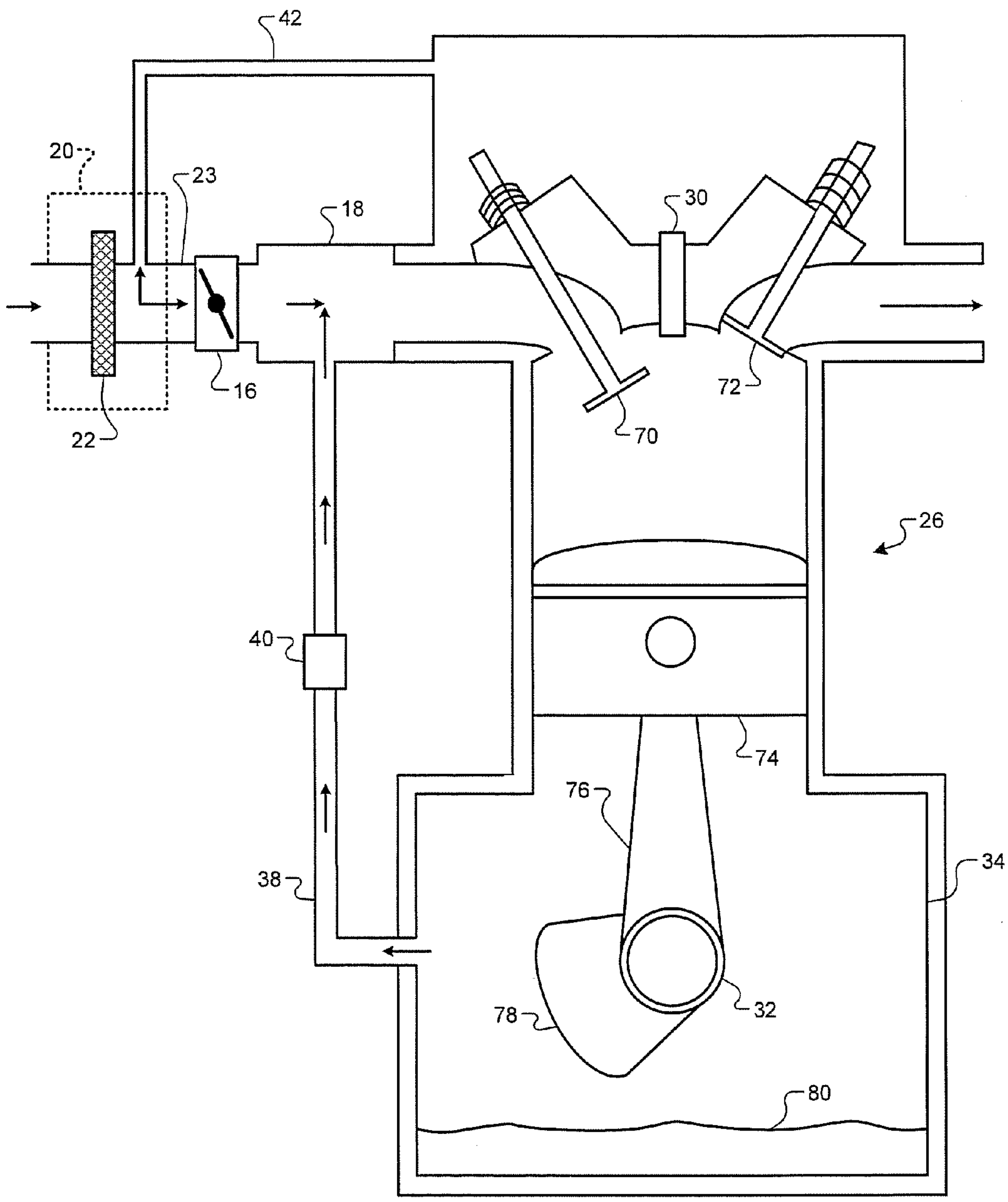
FIG. 2 is a cross-sectional view of a cylinder according to one implementation of the present disclosure.

Referring now to FIG. 2, an example of one of the plurality of cylinders 26 is shown. The cylinder 26 draws in air from the intake manifold 18 via an intake valve 70. In some implementations, the cylinder 26 may inject fuel into the air to create the A/F mixture at a location before the intake valve 70 (port fuel injection). The cylinder 26 expels exhaust gas produced during combustion into the exhaust manifold 50 via an exhaust valve 72. The intake valve 70 and the exhaust valve 72 may be actuated by one or more camshafts (not shown).

The cylinder 26 further includes a piston 74. The piston 74 compresses the A/F mixture within the cylinder 26 during a compression stroke of the engine 12. The A/F mixture is combusted (e.g., using spark plug 30) which drives the piston 74 downward generating drive torque. The drive torque rotates the crankshaft 32 which is connected to the piston 74 using a connecting rod 76. The crankshaft 32 may be connected to a counterweight 78. The crankcase 34 houses the various components of the cylinder 26. Specifically, the crankcase 34 includes oil 80 that lubricates the moving parts of the cylinder 26.

As previously described, blow-by vapors may enter the crankcase 34 and contaminate the oil 80 causing damage and/or decreased performance. The PCV system 36, however, vents blow-by vapors from the crankcase 34. Specifically, the PCV hose 38 may connect the crankcase 34 to the intake manifold 18 at a location downstream from the throttle 16. The PCV valve 40 may open when the blow-by vapors build up to exceed a critical pressure, thereby venting the blow-by vapors from the crankcase 34 into the intake manifold 18. Additionally, as previously described, the PCV system 36 may further include a breather tube 42 that connects the crankcase 34 to the air inlet duct 23 at a location downstream from the air filter 22. In other words, filtered air may flow through the breather tube 42 into the crankcase 34 further diluting the blow-by vapors and improving circulation which improves performance of the PCV system 36.

Figure 3:
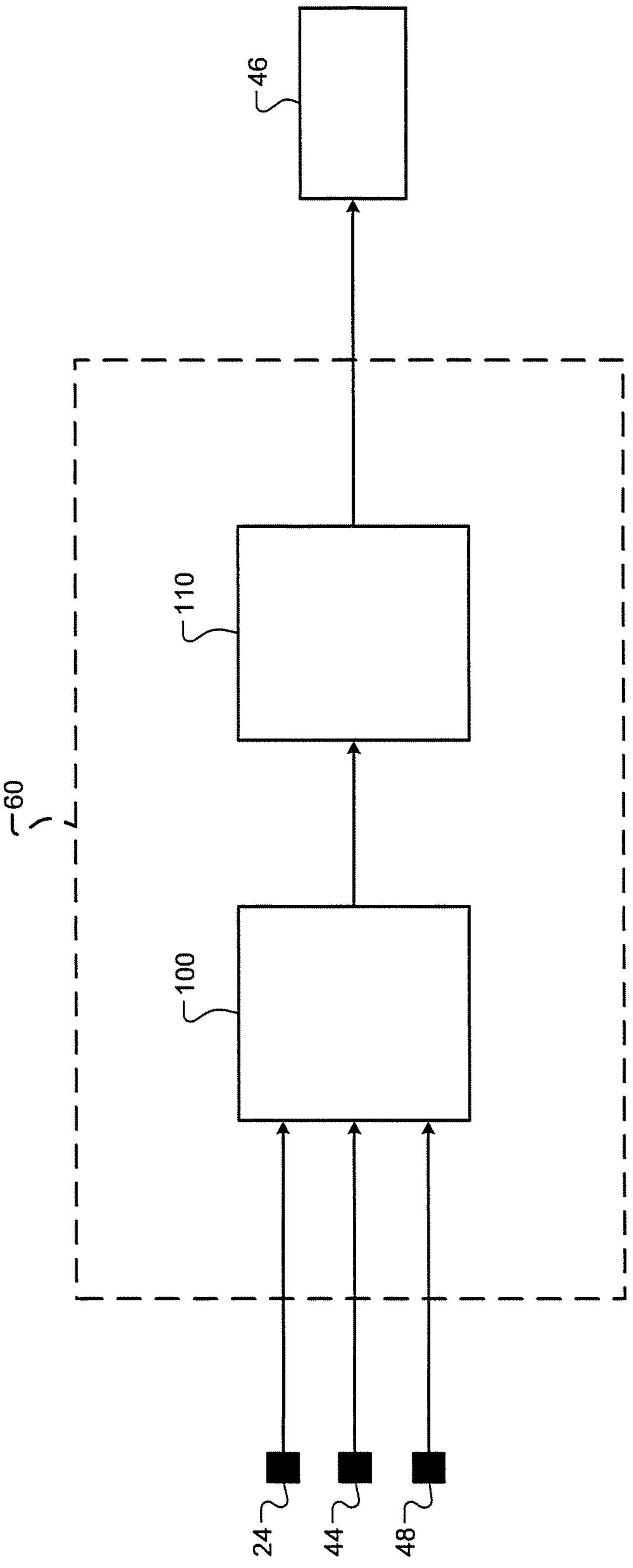
FIG. 3 is a functional block diagram of a control module according to one implementation of the present disclosure.

Referring now to FIG. 3, an example of the control module 60 is shown. The control module 60 may include an icing condition detection module 100 and an icing prevention module 110.

The icing condition detection module 100 receives a signal indicating ambient temperature from the ambient temperature sensor 24. The icing condition detection module 100 may also receive signals indicating engine speed and vehicle speed from the engine speed sensor 44 and the TOSS sensor 48, respectively. The icing condition detection module 100 may also receive other signals to help detect icing such as, but not limited to, crankcase pressure. The icing condition detection module 100 detects an icing condition based the received signals during a first predetermined period. The icing condition detection module 100 may generate an icing condition signal when the icing condition is detected.

For example, the icing condition detection module 100 may detect an icing condition when the ambient temperature is less than the predetermined temperature for the first predetermined period. Alternatively, for example, the icing condition detection module 100 may detect an icing condition when for the first predetermined period (i) the ambient temperature is less than the predetermined temperature, (ii) engine speed is greater than the predetermined engine speed, and (iii) vehicle speed is greater than a predetermined vehicle speed.

The predetermined temperature represents a temperature where icing may occur. In other words, the predetermined temperature may be less than or equal to 0° C. For example only, the predetermined temperature may be approximately −30° C. Additionally, for example, the predetermined engine speed may be greater than or equal to an idle speed of the engine 12. Furthermore, for example, the predetermined vehicle speed may be greater than or equal to 40 mph. For example only, the predetermined vehicle speed may be approximately 50 mph.

The icing prevention module 110 receives the icing condition signal from the icing condition detection module 100 when the icing condition is detected. The icing prevention module 110 may adjust operation of the engine 12 to prevent icing from occurring in the PCV system 36. Specifically, the icing prevention module 110 may increase engine speed for a second predetermined period. Increasing the engine speed increases oil temperature which increases a temperature of the blow-by vapors in the PCV system 36. For example, the second predetermined period may be calibrated based on a design of the engine 12 (e.g., a volume of the crankcase 34).

For example, the icing prevention module 110 may downshift the transmission 46 for the second predetermined period. Specifically, the icing prevention module 110 may downshift the transmission 46 by N gear ratios ($N \geq 1$). For example, the icing prevention module 110 may downshift the transmission 46 from a highest gear to a next-highest gear (e.g., $6^{th}$ to $5^{th}$, $5^{th}$ to $4^{th}$, $4^{th}$ to $3^{rd}$, etc.). The icing prevention module 110, however, may also downshift the transmission by two or more gear ratios (e.g., $6^{th}$ to $4^{th}$). For example, the icing prevention module 110 may downshift the transmission 46 by two or more gear ratios during extremely cold ambient temperatures.

After the second predetermined period has elapsed, the icing prevention module 110 may decrease the engine speed to a desired engine speed corresponding to normal vehicle operation. For example, the icing prevention module 110 may upshift the transmission 46 back to a highest gear (e.g., $5^{th}$ to $6^{th}$). The icing prevention module 110, however, may also control engine speed according to other suitable methods.

Figure 4B:
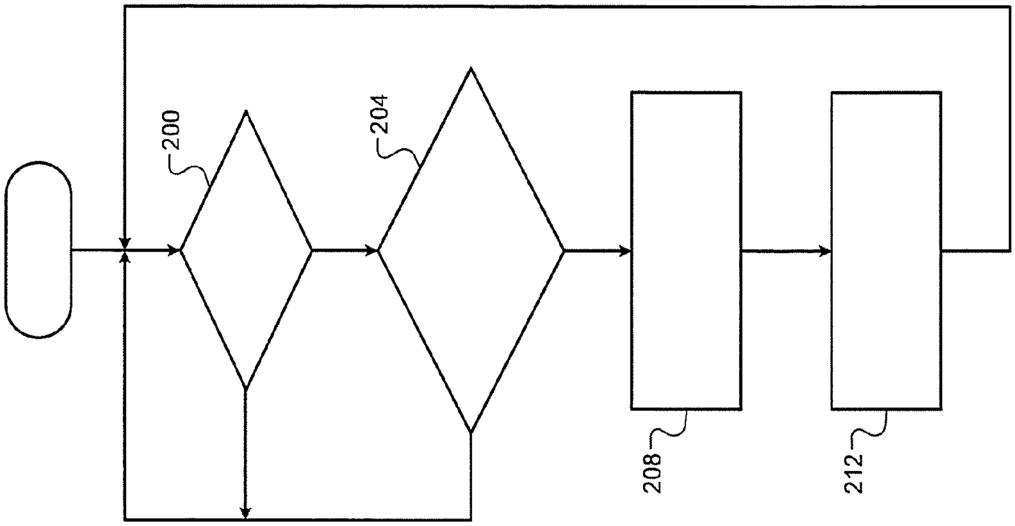
FIG. 4B is a flow diagram of a second method for preventing icing in a PCV system according to one implementation of the present disclosure.
Figure 4A:
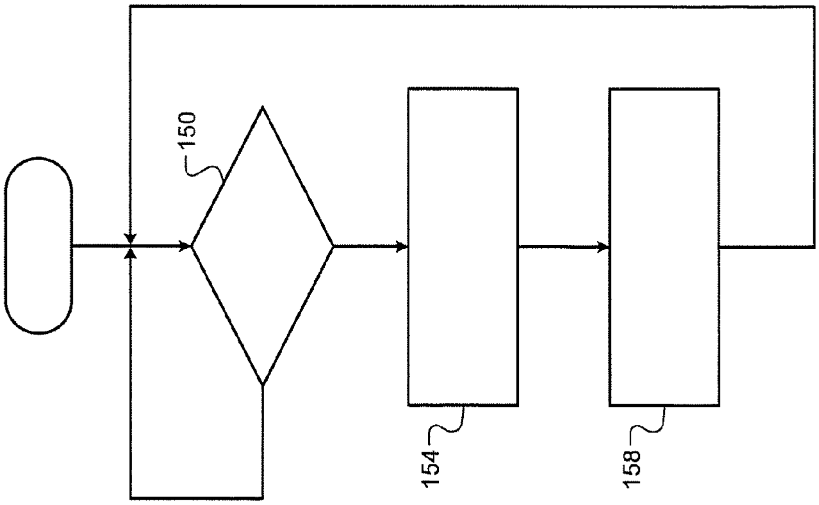
FIG. 4A is a flow diagram of a first method for preventing icing in a positive crankcase ventilation (PCV) system according to one implementation of the present disclosure.

Referring now to FIG. 4A, a first method for preventing icing in the PCV system 36 begins at 150. At 150, the control module 60 determines whether the icing condition is present for the first predetermined period based on ambient temperature. Specifically, the control module 60 determines whether ambient temperature ($T_{amb}$) is less than the predetermined temperature ($T_{pred}$) for the first predetermined period. If true, control may proceed to 154. If false, control may return to 150.

At 154, the control module 60 may increase engine speed for a second predetermined period. Specifically, the control module 60 may downshift the transmission 46 for the second predetermined period. At 158 (i.e., after the second predetermined period), the control module 60 decrease engine speed to a desired engine speed corresponding to normal engine operation. Control may then return to 150.

Referring now to FIG. 4B, a second method for preventing icing in the PCV system 36 begins at 200. At 200, the control module 60 determines whether the icing condition is present for the first predetermined period based on ambient temperature, engine speed, and vehicle speed. Specifically, at 200 the control module 60 determines whether ambient temperature ($T_{amb}$) is less than the predetermined temperature ($T_{pred}$) for the first predetermined period. If true, control may proceed to 204. If false, control may return to 200. At 204, the control module 60 determines whether the engine and vehicle speeds are greater than the predetermined engine speed and the predetermined vehicle speed, respectively. If true, control may proceed to 208. If false, control may return to 200.

At 208, the control module 60 may increase engine speed for a second predetermined period. Specifically, the control module 60 may downshift the transmission 46 for the second predetermined period. At 212 (i.e., after the second predetermined period), the control module 60 may decrease engine speed to a desired engine speed corresponding to normal engine operation. Control may then return to 200.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for an engine, comprising:

an icing condition detection module that detects an icing condition of a positive crankcase ventilation (PCV) system of the engine when an ambient temperature is less than a predetermined temperature for a first predetermined period; and an icing prevention module that increases engine speed for a second predetermined period when the icing condition is detected.

2. The control system of claim 1, wherein the icing prevention module increases the engine speed by downshifting a transmission for the second predetermined period.

3. The control system of claim 2, wherein the icing prevention module downshifts the transmission by N gear ratios, wherein N is an integer greater than or equal to one.

4. The control system of claim 2, wherein the icing prevention module downshifts the transmission from a highest gear ratio to a next-highest gear ratio.

5. The control system of claim 1, wherein the predetermined temperature is less than or equal to zero degrees Celsius (° C.).

6. The control system of claim 1, wherein the predetermined temperature is approximately negative 30° C.

7. The control system of claim 1, wherein the icing condition detection module detects the icing condition of the PCV system of the engine when for the first predetermined period (i) the ambient temperature is less than the predetermined temperature, (ii) engine speed is greater than a predetermined engine speed, and (iii) vehicle speed is greater than a predetermined vehicle speed.

8. The control system of claim 7, wherein the predetermined engine speed is greater than or equal to an idle speed of the engine.

9. The control system of claim 7, wherein the predetermined vehicle speed is greater than or equal to 40 miles per hour (mph).

10. The control system of claim 7, wherein the predetermined vehicle speed is approximately 50 mph.

11. A method for controlling an engine, comprising:

detecting an icing condition of a positive crankcase ventilation (PCV) system of the engine when an ambient temperature is less than a predetermined temperature for a first predetermined period; and increasing engine speed for a second predetermined period when the icing condition is detected.

12. The method of claim 11, further comprising increasing the engine speed by downshifting a transmission for the second predetermined period.

13. The method of claim 12, further comprising downshifting the transmission by N gear ratios, wherein N is an integer greater than or equal to one.

14. The method of claim 12, further comprising downshifting the transmission from a highest gear ratio to a next-highest gear ratio.

15. The method of claim 11, wherein the predetermined temperature is less than or equal to zero degrees Celsius (° C.).

16. The method of claim 11, wherein the predetermined temperature is approximately negative 30° C.

17. The method of claim 11, further comprising detecting the icing condition of the PCV system of the engine when for the first predetermined period (i) the ambient temperature is less than the predetermined temperature, (ii) engine speed is greater than a predetermined engine speed, and (iii) vehicle speed is greater than a predetermined vehicle speed.

18. The method of claim 17, wherein the predetermined engine speed is greater than or equal to an idle speed of the engine.

19. The method of claim 17, wherein the predetermined vehicle speed is greater than or equal to 40 miles per hour (mph).

20. The method of claim 17, wherein the predetermined vehicle speed is approximately 50 mph.

* * * * *